May 7, 1968 R. ROBBINS 3,382,465
EQUALIZERS COMPRISING INTERCONNECTED DIRECTIONAL COUPLERS
Filed March 20, 1964 2 Sheets-Sheet 1
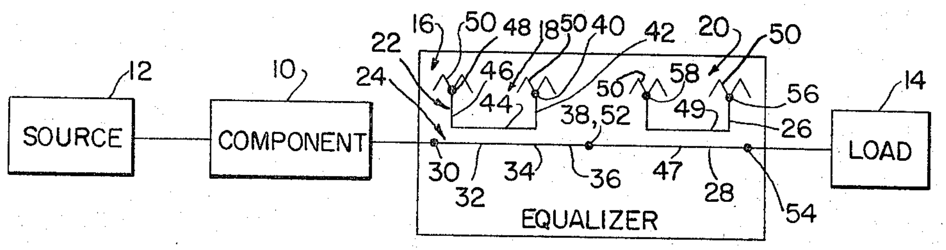
FIG. 1
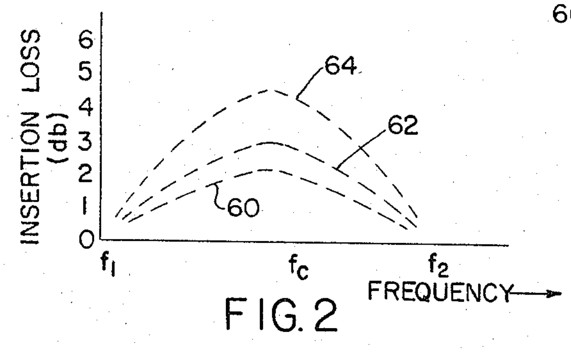
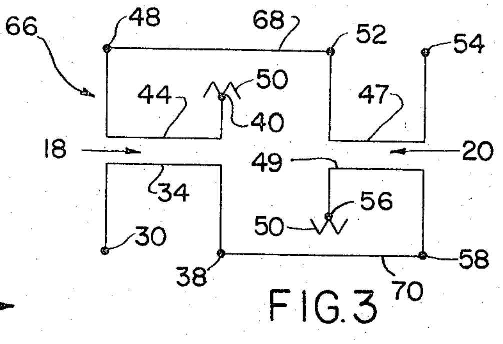
FIG. 2 FIG. 3
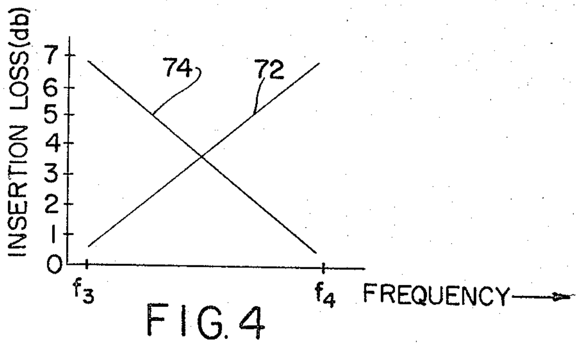
FIG. 4
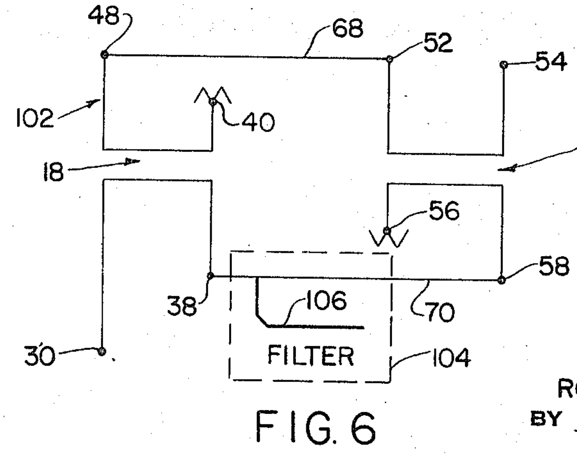
FIG. 6
INVENTOR
ROBERT ROBBINS
BY
ATTORNEY INVENTOR
ROBERT ROBBINS
BY
Louis Etlinger
ATTORNEY 3,382,465

EQUALIZERS COMPRISING INTERCONNECTED DIRECTIONAL COUPLERS

Robert Robbins, Nashua, N.H., assignor to Sanders Associates, Inc., Nashua, N.H., a corporation of Delaware Filed Mar. 20, 1964, Ser. No. 353,378
25 Claims. (Cl. 333—28)

ABSTRACT OF THE DISCLOSURE

Disclosed herein is an improved distributed parameter transmission line equalizer having low loss and being readily adaptable to compensate a variety of transmission characteristics. The invention is suited for economical construction with strip transmission line, and provides relatively flat transmission characteristics in circuits incorporating travelling wave devices or delay lines.

This invention relates to transmission line equalizers utilizing one or more selected directional couplers. The invention also comprehends high frequency circuits employing such equalizers.

The equalizers, which can readily be constructed at relatively low cost, operate over wide frequency bands and with remarkably low loss.

In general, a transmission line equalizer is a distributed parameter filter whose frequency characteristic is such that it compensates for the transmission variation of another device. As a result, the combination of the equalizer and the other device has an essentially flat transmission characteristic over a band of frequencies, i.e. the ratio of output signal amplitude to input signal amplitude remains essentially uniform as the input frequency is changed.

Equalizers are extensively used in microwave circuits and systems to maintain the amplitude of a signal uniform over an operating frequency range.

It is an object of the present invention to provide an improved transmission line equalizer.

Another object of the invention is to provide a distributed parameter equalizer having relatively low loss, more particularly, to provide an equalizer whose minimum loss is small.

A further object of the invention is to provide a two-port, distributed parameter equalizer that presents relatively matched impedances at its ports, and to provide an equalizer that isolates mismatches between the impedances presented to its input and output ports.

It is also an object of the invention to provide a transmission line equalizer that can readily be adapted to compensate a variety of transmission characteristics.

Another object of the invention is to provide an equalizer of the above character that is suited for economical construction with strip transmission line.

A further object of the invention is to provide microwave circuits having relatively flat transmission characteristics. More particularly, it is an object to provide such a transmission characteristic in circuits incorporating travelling wave devices, and also in circuits having delay lines.

Other objects of the invention will in part be obvious and will in part appear hereinafter.

The invention accordingly comprises the features of construction, combinations of elements, and arrangement of parts exemplified in the constructions hereinafter set forth, and the scope of the invention will be indicated in the claims.

For a fuller understanding of the nature and objects of the invention, reference should be had to the following detailed description taken in connection with the accompanying drawings in which:

FIG. 1 is a schematic representation of a microwave circuit equalized with an equalizer embodying the invention;

FIG. 2 is a graph of insertion loss as a function of frequency for an equalizer of the type shown in FIG. 1;

FIG. 3 is a schematic representation of another equalizer embodying the invention;

FIG. 4 is a graph of insertion loss as a function of frequency for the equalizer of FIG. 3;

FIG. 6 is a schematic representation of a further equalizer embodying the invention.

Figure 5:
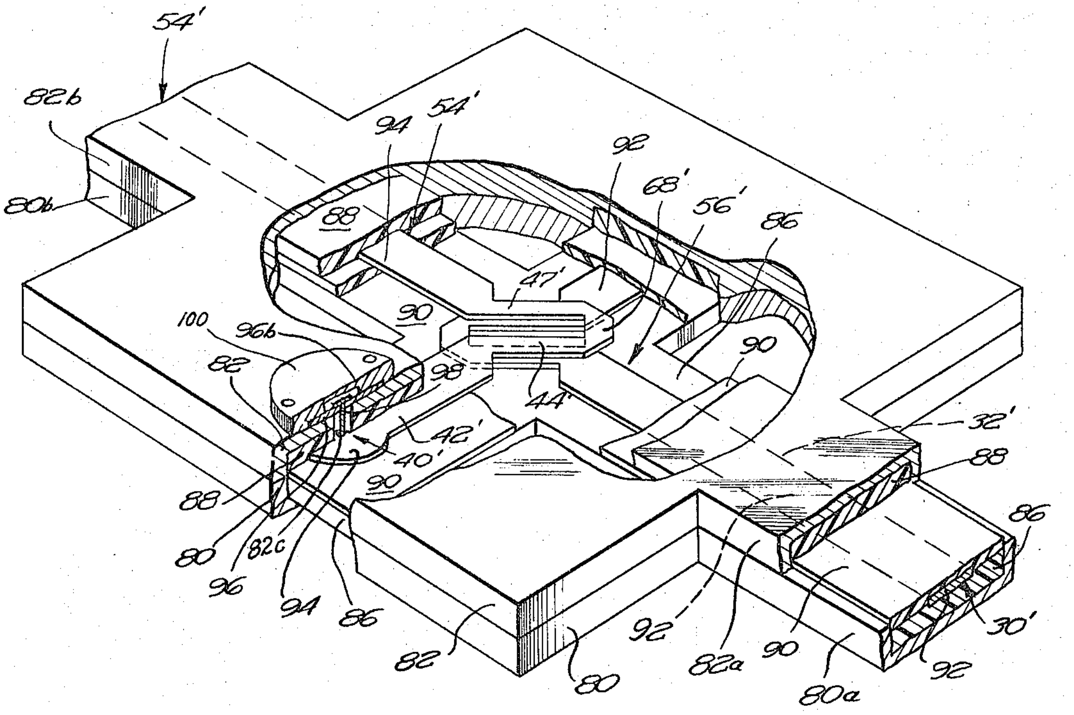
FIG. 5 is a perspective view, partly broken away, showing a construction for the equalizer of FIG. 3.

In general, equalizers embodying the invention utilize two or more interconnected four-port directional couplers. In certain embodiments, the equalizers have a minimum loss determined by the couplers' coupling factors. In other embodiments, on the other hand, the interconnected couplers have theoretically zero minimum loss.

It has also been found that directional couplers operated at frequencies different from those of optimum directional coupling operation provide highly useful equalization. However, the couplers utilized in a further embodiment of the invention are operated at the frequency of their optimum coupling performance.

Although the invention can be practiced with different couplers, especially those conforming to a particular scattering matrix set forth hereinafter, it is here described with reference to parallel line couplers.

FIG. 1 shows a microwave circuit in which a component 10 receives a signal from a source 12 and delivers a corresponding signal to a load 14. An equalizer indicated generally at 16 is connected between the component 10 and the load 14 and equalizes the frequency-dependent transmission characteristic of the component to provide an essentially flat transmission characteristic between the source and the load.

The source 12 may be an oscillator, a transmitter, an antenna, or any other source of a high frequency signal that is to be processed and applied to a load. The component 10 is a microwave signal processing device and may be an amplifier, a delay line, a mixer, or the like. It has a nonuniform transmission characteristic over the frequency range of the source 10.

For example, assume that the component 10 is a travelling wave tube. The gain of such tubes has a maximum value near the center of the operating frequency range, and decreases essentially symmetrically on either side of the central frequency.

The load 14 shown in FIG. 1 comprises one or more components that use the signal output from the component 10. For example, the load may be a transmitting antenna, a receiver, a recording device, or some other microwave terminal device.

The illustrated equalizer 16 comprises two series-connected parallel line directional couplers indicated generally at 18 and 20. The coupler 18 comprises strip transmission line inner conductors 22 and 24 disposed between a pair of ground plane outer conductors not shown in FIG. 1. The coupler 20, which is preferably identical to the coupler 18, contains strip transmission line inner conductors 26 and 28.

Considering the coupler 18, the inner conductor 24 has, in succession, an input port 30, an end section 32, a coupling section 34, an end section 36 and a transmitted port 38. The coupler's other inner conductor 22 comprises an isolated port 40, an end section 42, a coupling section 44, an end section 46 and a coupled port 48. It should be understood that this designation of ports within each coupler has meaning only with reference to the port designated as the input port.

The coupling sections 34 and 44 conventionally are parallel and in close proximity to each other for a length equivalent to a quarter-wavelength at a selected design frequency $f_0$. With this construction, a portion of the signal applied to the input port 30 is transferred from the coupling section 34 to the coupling section 44 in a well known manner by the time-varying electric and magnetic fields associated with the input signal. The energy transferred to the coupling section 44 travels to the coupled port 48 thereon; the remainder of the input energy is transferred to the coupling section 44 travels to the coutransmitted port 38.

The portion of the input energy coupled to the conductor 22 increases as the space between the coupling sections 34 and 44 is decreased. The midband amplitude coupling of a directional coupler can be expressed as a coupling factor $k$ defined by $(V_c/V_{in})$ at the midband frequency of the coupler, where $(V_c/V_{in})$ is the ratio of the voltage at the coupled port to the input voltage. Moreover, at frequencies where the length of each coupling section is an odd multiple of a quarter-wavelength, the output signal appearing at the transmitted port 38 is delayed with respect to the output signal at the coupled port 48 by a phase lag of 90°.

For a parallel-line directional coupler, the coupling sections are one quarter-wavelength long at $f_0$. The frequency $f_c$, as used herein, refers to the midband frequency at which the equalizer is actually operated.

In the illustrated equalizer 16 in FIG. 1, only the output signal at the transmitted port 38 is utilized. Accordingly, the coupled port 48 and the isolated port 40 are connected to conventional matched terminations 50.

The coupler 20 has the same construction as the coupler 18, with the inner conductor 28 having an input port 52, a coupling section 47 between two end sections, and a transmitted port 54. The inner conductor 26 comprises an isolated port 56, a coupling section 49 between end sections, and a coupled port 58. As also shown, matched terminations 50 are connected to the isolated port 56 and to the coupled port 58. The input port 52 is connected to the transmitted port 38 of the coupler 18 and the transmitted port 54 is connected to the load 14.

The coupling sections 47 and 49 may provide a coupling factor different from the coupling factor of the coupler 18. However, the coupling sections of both the couplers 18 and 20 generally are a quarter-wavelength long at the same design frequency $f_0$.

Curve 60 in FIG. 2 represents the ratio of output voltage to input voltage for an equalizer comprising a single parallel line coupler, such as the FIG. 1 coupler 20, whose coupling factor $k$ is 0.636 over a 2:1 frequency range extending from $f_1$ to $f_2$ and centered about a frequency $f_c$ equal to $[f_1+\frac{1}{2}(f_2-f_1)]$. The frequency $f_c$ is generally greater than $f_0$, as discussed below. This voltage ratio is herein termed the insertion loss of the equalizer and is conventionally represented in terms of decibels.

Examination of curve 60 indicates that at the lower frequency $f_1$ theoretically all the input voltage appears at the transmitted port 54. Hence, the insertion loss approaches zero. As the frequency of the input signal increases to the midband value $f_c$, the portion of input voltage appearing at the transmitted port decreases to a minimum value. Here, the equalizer has a maximum loss of 2.25 db.

As the frequency increases further to the upper frequency $f_2$, the portion of the input voltage appearing at the transmitted output again increases until, theoretically, all the input voltage appears at the transmitted port.

When the midband coupling factor $k$ is increased to 0.707, as by bringing the coupler's coupling sections closer together, the coupler's loss has the characteristic represented by curve 62 in FIG. 2. This curve has the same "umbrella" shape as the curve 60 but the maximum, midband loss is increased to 3 db.

Curve 64 of FIG. 2 represents the combined insertion loss characteristic for two couplers, each of which has a coupling factor $k$ of 0.636, connected in series in the same manner as the couplers 18 and 20 in the equalizer 16 of FIG. 1. As one would expect, the insertion loss of two identical couplers is twice the loss of a single coupler having the same coupling factor.

It has been found that the insertion loss curves shown in FIG. 2 have the same general form as the gain of travelling wave tubes. Hence, the present equalizers constructed with series-connected parallel line directional couplers can equalize the output of a travelling wave tube, i.e. compensate for the tube's frequency-dependent gain variation, to a remarkably high degree.

According to the invention, the travelling wave tube equalizer is constructed by determining the change in the tube's gain between its maximum midband value and the value at either end of its operating range. The desired equalizer has a coupling factor $k$ such that the difference between its midband insertion loss and its loss at the ends of the frequency range of the tube is equal to this gain variation of the tube.

Assuming that the tube operates over a frequency range from $f_1$ to $f_2$, where $f_2$ does not exceed twice $f_1$, the directional couplers for the equalizer are constructed with coupling sections which are a quarter-wavelength long at a frequency $f_0$, such that $$f_0=\frac{1}{2n+1}[f_1+\tfrac{1}{2}(f_2-f_1)]=\frac{1}{(2n+1)}[f_c] \qquad (2)$$

where $n$ is the largest integer that results in $2f_0$ equalling or exceeding $(f_2-f_1)$.

With $f_0$ related to $f_c$ in this manner, at the midband operating frequency $f_c$ the lengths of the coupling sections of the equalizer are equal to an odd integral multiple of a quarter-wavelength at the frequency $f_0$; the odd integral multiple is the $(2n+1)$ term of Equation 2.

As an example, assume that the travelling wave tube's voltage gain is 20 db at a lower frequency $f_1$ of 700 mc., increases to 24.5 db at a frequency $f_c$ of 1050 mc. and decreases to 20 db at 1400 mc. $(f_2)$. The 4.5 db change in the tube's output voltage can be equalized with an equalizer having the loss characteristic shown in curve 64 of FIG. 2. Accordingly, the equalizer is constructed with two 0.636 parallel line couplers having their input and transmitted ports in series. For $n=1$, $f_0$ is 350 mc.; for $n=2$, $f_0$ would be 210 mc. However, 2 times 210 mc. does not equal or exceed $(f_2-f_1)$, i.e. 700 mc., whereas 2 times 350 mc. does equal it. Hence, the coupling sections are made a quarter-wavelength long at a frequency $f_0$ of 350 mc.

A typical equalizer for a travelling wave tube operating from 2 gc. to 4 gc. and constructed in this manner provides a maximum insertion loss at 3 gc. of 4.5 db. with an accuracy of a 0.5 db and has a minimum insertion loss of less than 0.5 db at the end frequencies 2 gc. and 4 gc.

As indicated above, the present equalizers have relatively uniform input and output impedances. As an example, the 2 gc. to 4 gc. travelling wave tube equalizer referred to above exhibited a maximum VSWR of less than 1.5 over its 2:1 frequency range.

It will now be apparent that the equalizer 16, comprising two directional couplers in series, is particularly suited for equalizing a signal whose amplitude has a maximum value at a frequency $f_c$ and decreases substantially symmetrically by a known amount at frequencies above and below $f_c$. The equalizer is designed to have a midband coupling factor $k$ that provides variation in insertion loss equal to the maximum decibel variation in signal amplitude that is to be equalized.

The equalizer operates within a frequency range from $f_1$ to $f_2$ and centered at $f_c$. The couplers for the equalizer have a midband design frequency $f_0$, the frequency of maximum coupling and maximum directivity, determined according to Equation 2.

The maximum value of $n$ that provides a frequency $f_0$ equal to or greater than $\frac{1}{2}(f_2-f_1)$ is selected so that the insertion loss characteristic of the equalizer will decrease from its value at $f_c$ over the entire range $f_1$ to $f_2$. In the event that $f_0$ is less than $\frac{1}{2}(f_2-f_1)$, the loss of the equalizer will first decrease as the operating frequency differs from $f_c$ but will then increase before the operating frequency reaches $f_1$ or $f_2$.

With parallel line directional couplers, when the range $f_1$ to $f_2$ exceeds 2:1, the equalizer insertion loss will cease decreasing and begin to increase as the frequencies $f_1$ and $f_2$ are approached from the frequency $f_c$.

However, of particular interest is the case where $f_2$ is equal to $2f_1$, i.e. a 2:1 range, for then the equalizer insertion loss has a minimum value at the frequencies $f_1$ and $f_2$. Also, at the frequency $f_c$, the insertion loss as determined by the coupling factor $k$ is equal to the gain variation of a travelling wave tube operating over the same frequency range and centered at $f_c$. The equalizer insertion loss characteristic between the frequencies $f_1$ and $f_2$ closely matches the gain variation of the tube. As a result, the tube and equalizer combination has remarkably flat transmission over the entire 2:1 frequency range.

FIG. 3 shows another equalizer indicated generally at 66 embodying the invention and incorporating the directional couplers 18 and 20. This time the couplers are connected in a cascade arrangement rather than in series as shown in FIG. 1 for the equalizer 16.

More specifically, the input port 30 of the coupler 18 is the input for the equalizer 66 and the isolated port 40 is connected to a termination 50. A transmission line having an inner conductor 68 interconnects the port 48 of the coupler 18 with the port 52 of the coupler 20. A transmission line with an inner conductor 70, preferably of the same length as the conductor 68, interconnects the port 38 of coupler 18 and the port 58 of the coupler 20. The output port of the equalizer 66 is the port 54 of the coupler 20. The characteristic impedance throughout the equalizer 66 is preferably uniform.

When the couplers 18 and 20 are 3 db couplers, i.e. with $k=0.707$, at the frequency $f_0$, the arrangement shown in FIG. 3 operates to transfer substantially all the signal delivered to the port 30 to the coupled port 54. Only a relatively insignificant portion of the input signal appears at the transmitted port 56. The equalizer 66 comprising the cascaded couplers 18 and 20, thus has a minimum insertion loss (or conversely maximum transmission) at the frequency $f_0$ and odd integral multiples thereof. The insertion loss characteristic of the equalizer is further a periodic function of frequency having maxima at the even integral multiples of the frequency $f_0$. The variation of the insertion loss with frequency is substantially monotonic between the frequency limits $2nf_0$ to $2(n+\frac{1}{3})f_0$ for the negative going portion of the periodic function and between $2(n+\frac{2}{3})f_0$ to $2(n+1)f_0$ for the positive going portion of the periodic function. That portion of the insertion loss-versus-frequency characteristic of the equalizer lying between $2(n+\frac{1}{3})f_0$ to $2(n+\frac{2}{3})f_0$ is such that the variation with frequency is insufficient to be of practical use in the present invention. The frequency limits for the equalizer defined as $2nf_0$ to $2(n+\frac{1}{3})f_0$ and $2(n+\frac{2}{3})f_0$ to $2(n+1)f_0$ are herein termed the design ranges of the equalizer.

At frequencies within the design range, the transmission through the equalizer from port 30 to port 54 varies substantially monotonically with frequency with a slope which may be selected to match the transmission of another device and thereby equalize its output signal.

More specifically, curve 72 of FIG. 4 depicts the insertion loss of the equalizer 66, between the input port 30 and the transmitted port 56, over a frequency range $f_3$ to $f_4$ which lies within the frequency limits $2(n+\frac{2}{3})f_0$ to $2(n+1)f_0$. The curve 72 extends between a lower frequency $f_3$ and an upper frequency $f_4$ that may, for example, be 1 gc. and 4 gc., respectively. The frequency $f_0$ for the equalizer whose performance is shown in FIG. 4 is approximately 10 gc.

At the 1 gc. lower frequency $f_3$, the couplers of the equalizer 66 transfer little energy between their coupling sections and hence the insertion loss to port 56 is small, e.g. 0.5 db. The insertion loss of curve 72 monotonically increases as the frequency is increased, reaching 7 db at the 4 gc. upper frequency $f_4$.

The insertion loss from the input port 30 to the coupled port 54 varies in essentially the opposite manner, as shown in curve 74 (FIG. 4). That is, when the port 54 is the equalizer output, the equalizer 66 provides a substantially monotonic negative loss-versus-frequency characteristic having a maximum at $f_3$ and a minimum at $f_4$. When the equalizer is operated over that portion of the design range defined by the limits $2nf_0$ to $2(n+\frac{1}{3})f_0$ the insertion loss characteristics of the equalizer are reversed, i.e. curve 72 describes the insertion loss from the input port 30 to the coupled port 54 and the curve 74 relates to the insertion loss from the input port 30 to the transmitted port 56.

The equalization characteristic of the negative going portion of the insertion loss-versus-frequency curve of the equalizer is particularly suitable for equalizing the transmission of conventional delay lines of the transmission line type, whose insertion losses increase with frequency.

In practice, a transmission line delay line whose attenuation increased by 4.5 db over a 2:1 frequency range was equalized with an equalizer of the type shown in FIG. 3 so that the combination of the delay line and the equalizer exhibited a transmission that varied by less than 1 db. Accordingly, as a specific embodiment of the invention, the equalizer 66 is connected in FIG. 1 in place of the equalizer 16, and the component 10 is a delay line. The equalizer's port 56 is terminated and the port 54 is connected to the load 14.

As a further specific embodiment of the invention, the port 30 of the equalizer 66 is advantageously connected to the output of a backward wave oscillator, the output of which conventionally increases with frequency. Accordingly, the port 54 is terminated and the port 56 is connected to the load of the BWO, thereby employing the insertion loss of curve 72.

It will be appreciated that the equalizer 66 has a low minimum loss, typically below 1 db, at one end of each loss characteristic depicted with the curves 72 and 74.

The equalizer 66 can also be operated at frequencies above the design frequency range, and hence above $f_0$. However, the insertion loss becomes periodic as the operating frequency equals even and then odd multiples of $f_0$.

FIG. 5 shows a compact construction for the equalizer 66 of FIG. 3. Although the inner conductors in FIG. 3 are represented as lying in a single plane, in the construction of FIG. 5 they are disposed in two planes as shown in the enlarged fragmentary view of FIG. 5A. The inner conductor sections in FIGS. 5 and 5A have the same reference numbers as corresponding inner conductor sections in FIG. 3, followed by prime superscripts. Thus, in FIGS. 5 and 5A the input port 30' corresponds to the FIG. 3 port 30.

As shown in FIG. 5, the equalizer 66 has a conductive lower housing 80 and a mating conductive upper housing 82. The housings 80 and 82 are symmetrically recessed to receive an inner conductor structure comprising a lower dielectric sheet 86, an upper dielectric sheet 88, and an insulating card 90 sandwiched between the sheets 86 and 88. The sheets 86 and 88 and the card 90 preferably have the same outline shape, comprising four arms meeting at right angles to form a symmetrical cross. The inner conductor coupling sections are disposed at the intersection, as described below.

At the input port 30', the housings 80 and 82 have connecting stems 80*a* and 82*a*. Similarly, there are connecting stems 80*b* and 82*b* at the output port 54'.

A strip transmission line inner conductor 92 is bonded to the upper surface of the dielectric sheet 86 and an inner conductor 94 is bonded to the bottom surface of the upper dielectric sheet 88. The insulating card 90 separates the conductors 92 and 94. The dielectric sheets 86 and 88 space the inner conductors 92 and 94 from the adjacent inner surfaces of the housings 80 and 82, which form the ground plane outer conductors associated with the inner conductors according to conventional strip transmission line techniques.

From the port 30', the inner conductor 92 successively comprises an end section 32', a coupling section 34', an interconnecting section 70', a coupling section 49', and another end section. At the port 56', the inner conductor 92 is terminated, as indicated in FIG. 3, with a construction not seen in FIG. 5.

From the port 54', the inner conductor 94 successively comprises an end section, a coupling section 47', an interconnecting section 68', a coupling section 44', and an end section 42' leading to the port 40'.

The termination at the port 40' is constructed with a disk or wafer 96 of resistive material connected at its center to the end of the section 42' with a pin 98 assembled with the inner conductor 94 and disk 96. A metallic cap 100 clamps the disk in place and connects its periphery to the housing 82. In this manner, the disk 96 is electrically connected between the inner conductor 94 and the outer conductor provided by the housings 80 and 82.

More specifically, the resistive disk 96 is disposed on the outer surface of the housing 82 centered above a hole 82*c*. The pin 98 passes through the disk 96, extends through the hole 82*c* and passes through the dielectric sheet 88 to contact the inner conductor 94. The cap 100 is centrally recessed to insulate it from the central portion of the disk. Near its periphery, the cap engages the periphery of the disk and securely clamps it to the housing 82.

The end of the inner conductor 92 at the port 56' is preferably similarly terminated with a resistive disk electrically connected to the lower housing 80.

Figure 5A:
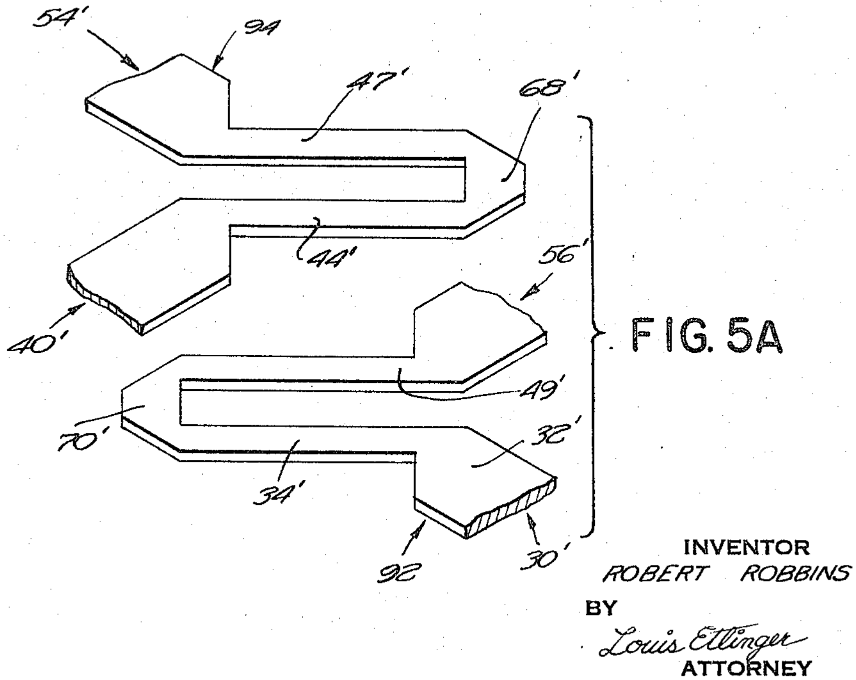
FIG. 5A is an enlarged fragmentary view of the inner conductor configuration in the equalizer of FIG. 5.

As shown in FIG. 5A the coupling sections 34' and 49' in the inner conductor 92 extend parallel to each other, spaced apart by the interconnecting section 70'. The coupling section 44' in the conductor 94 is parallel to and substantially in register with the coupling section 34'. The coupling sections 47' and 49' are likewise parallel and substantially in register with each other.

The coupling sections 34', 44', 47' and 49' of the inner conductors 92 and 94 are thinner than the remaining sections of these inner conductors to maintain a uniform impedance throughout the equalizer. More specifically, the close proximity of the coupling sections 34' and 49' to the sections 44' and 47', respectively, decreases the characteristic impedance of each coupling section. However, reducing the width of the inner conductor coupling sections produces a corresponding increase in the characteristic impedance and hence provides the desired impedance uniformity.

The coupling factor $k$ between the corresponding coupling sections 34' and 44', and 47' and 49' is readily changed by changing the thickness of the insulating card 90; it can also be changed by using insulating materials having different dielectric constants. The ability to change the coupling according to the latter technique, i.e. by using different materials for the insulating card 90, makes it possible for the same housings 80 and 82 and the same dielectric sheets 86 and 88 to be used in equalizers having different coupling factors. This is a substantial economy, since it obviates the requirement for housings with recesses of different depths and similar dimensional variations to construct equalizers having different midband coupling factors and different characteristic impedances.

FIG. 6 shows a two-coupler equalizer indicated generally at 102, particularly suitable for use at the design frequency $f_0$ at which the parallel line coupling sections are one quarter-wavelength long. At the ends of its frequency range, designated $f_5$ and $f_6$, the equalizer 102 has essentially zero loss between the input port 30 and the output port 54. It has maximum loss between these ports at the center, which in this case is the frequency to which the stub filter described hereinafter is tuned.

More specifically, the equalizer 102 is constructed with the two parallel line couplers 18 and 20 interconnected as in the equalizer 66 of FIG. 3. However, a transmission line filter indicated generally at 104 is in series with the inner conductor 70. Alternatively, the filter could be connected in the inner conductor 68. The filter 104 has maximum attenuation at the center of the equalizer's operating band. For most equalizing applications of the equalizer 102, it is desirable that the attenuation of the filter 104 drop off rapidly at either side of the frequency $f_0$, making it possible for the equalizer to have a small minimum insertion loss to its coupled output port 54 at the ends of its frequency range.

To provide this operation, the filter 104 is constructed with open-circuited stub 106 connected in parallel with the inner conductor 70. For the illustrated equalizer, the stub 106 is a quarter-wavelength long at the frequency $f_0$.

The operation of the filter 104 and the equalizer 102 can be considered as follows. With 3 db couplers, at the frequency $f_0$, one-half the input signal applied to the port 30 is coupled to the port 48 and one-half is transmitted to the port 38. However, at its connection to the inner conductor 70, the open circuited stub 106 appears as a short circuit. Hence, the filter 104 effectively reflects all the energy appearing at the port 38 so that substantially none reaches the port 58 of the directional coupler 20.

The signal coupled to the port 48 is applied to the port 52 of the coupler 20. However, half of this signal, or one-quarter of the input signal, is directed to the terminated port 56 so that only a quarter of the input energy to the equalizer 102 appears at the output port 54. Hence, at the center frequency $f_0$ it has a 6 db insertion loss to its port 54.

At frequencies removed from the frequency $f_0$, the quarter-wavelength stub 106 appears as a high impedance shunting the inner conductor 70 and hence has little effect on the equalizer's operation. As a result, the loss to the port 54 rapidly drops to a relatively low value at frequencies different from the frequecy $f_0$ and within the frequency range at which the couplers of the equalizer exhibit directional coupling operation.

The equalizer 102 of FIG. 6 has a low VSWR over the operating range $f_5$–$f_6$ except in the vicinity of the midband frequency where it rises to 3:1. This is due to the low impedance the stub 106 presents to the inner conductor 70 at the frequency $f_0$.

Although equalizers and equalized circuits embodying the invention have been discussed primarily with reference to parallel line directional couplers, the invention is not limited to such couplers. It will be apparent to those skilled in the art that other couplers, or hybrids, can be used to provide, in many instances, low minimum attenuation and a relatively uniform and low VSWR.

The preferred couplers can be described with a particular scattering matrix, as will now be discussed. The use of scattering matrices to describe and analyze microwave circuits is set forth in several publications, including "Principles of Microwave Circuits" by Montgomery, Dicke and Purcell, Chapter 5, McGraw-Hill, New York, 1948.

The scattering matrix for a single 3 db parallel line directional coupler, such as those shown in FIGS. 1 and 3 at 18 and at 20, is $$\begin{bmatrix} 0 & 0 & j0.707 & 0.707 \\ 0 & 0 & 0.707 & j0.707 \\ j0.707 & 0.707 & 0 & 0 \\ 0.707 & j0.707 & 0 & 0 \end{bmatrix} \quad (3)$$

A more general matrix describing the preferred couplers is $$\begin{bmatrix} 0 & 0 & j\Gamma & \sqrt{1-\Gamma^2} \\ 0 & 0 & \sqrt{1-\Gamma^2} & j\Gamma \\ j\Gamma & \sqrt{1-\Gamma^2} & 0 & 0 \\ \sqrt{1-\Gamma^2} & j\Gamma & 0 & 0 \end{bmatrix} \quad (4)$$

where $$\Gamma=\frac{k \sin\left(\frac{\pi}{2}\frac{f}{f_0}\right)}{\sqrt{1-k^2\cos^2\left(\frac{\pi}{2}\frac{f}{f_0}\right)}} \quad (5)$$

where $f$ is the operating frequency.

When two couplers conforming to matrix (4) above are connected in cascade as in FIG. 3, the resultant equalizer has the scattering matrix, $$\begin{bmatrix} 0 & A \\ A & 0 \end{bmatrix} \quad (6)$$

where $$A=\begin{vmatrix} (1-2\Gamma^2) & (2j\Gamma\sqrt{1-\Gamma^2}) \\ (2j\Gamma\sqrt{1-\Gamma^2}) & (1-2\Gamma^2) \end{vmatrix} \quad (7)$$

Thus, matricies 6 and 7 set forth the operation of an equalizer embodying to the invention and including two cascaded directional couplers, each of which conforms to matrix 4.

In summary, it has been found that interconnected directional couplers provide useful equalizers for many radio frequency circuits. For example, travelling wave amplifier tubes and transmission line delay lines can be efficiently equalized with the new equalizers.

The different equalizer arrangements illustrated above provide a variety of equalizing characteristics. The equalizers can have low minimum loss and low VSWR over wide frequency bands.

The couplers in many of the equalizers are operated at frequencies different from the design frequencies for directional coupling operation. Nevertheless, at the frequencies at which the equalizers are operated, the couplers operate primarily as directional couplers. The equalizing operation stems from the change in the directional coupling operation with frequency. With several embodiments, particularly advantageous equalization has been found over frequency bands excluding the midband design frequency for directional coupling operation.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. In apparatus having a source of radio frequency energy between a lower frequency $f_1$ and upper frequency $f_2$, an equalizer receiving at its input port the energy from said source and having a maximum loss from its input port to its output port at a frequency $f_c$ equal to $[f_1+\frac{1}{2}(f_2-f_1)]$, said equalizer comprising in combination (A) a first directional coupler having an input port, a transmitted port, a coupled port, and an isolated port, (B) a second directional coupler having an input port, a transmitted port, a coupled port, and an isolated port, (1) said input port of said second coupler being connected with said transmitted port of said first coupler, (2) said input port of said first coupler being said equalizer input port and said transmitted port of said second coupler being said equalizer output port, (C) each of said first and second directional couplers having maximum coupling from its input port to its coupled port, and maximum directivity, at a frequency $f_0$ defined by the equation $f_0=1/(2n+1)[f_c]$, where $n$ is the largest integer providing a frequency $f_0$ such that $2f_0$ is at least equal to $(f_2-f_1)$.

2. The equalizer defined in claim 1 in which $n$ is 1, so that the frequency $f_0=\frac{1}{3}(f_c)$.

3. The equalizer defined in claim 1 in which the frequency $f_1$ is at least as great as $(f_2/2)$.

4. The equalizer defined in claim 1 in which said couplers are parallel line directional couplers, each parallel line directional coupler having a pair of inner conductor coupling sections one quarter-wavelength long at the frequency $f_0$.

5. The equalizer defined in claim 1 further comprising terminating means connected to said isolated ports and to said coupled ports of said directional couplers.

6. The equalizer defined in claim 5 in which each of said first and second couplers conforms to the matrix $$\begin{bmatrix} 0 & 0 & j\Gamma & \sqrt{1-\Gamma^2} \\ 0 & 0 & \sqrt{1-\Gamma^2} & j\Gamma \\ j\Gamma & \sqrt{1-\Gamma^2} & 0 & 0 \\ \sqrt{1-\Gamma^2} & j\Gamma & 0 & 0 \end{bmatrix}$$

where $$\Gamma=\frac{k \sin\left(\frac{\pi}{2}\frac{f}{f_0}\right)}{\sqrt{1-k^2\cos^2\left(\frac{\pi}{2}\frac{f}{f_0}\right)}}$$

7. In apparatus having a radio frequency source producing energy at a frequency between a lower frequency $f_1$ and a higher frequency $f_2$, an equalizer having an input port in circuit with said source and having a maximum loss from its input port to its output port at a frequency $f_c$ equal to $[f_1+\frac{1}{2}(f_2-f_2)]$ said equalizer comprising in combination (A) a first parallel line directional coupler comprising first and second coupled inner conductor sections, (B) a second parallel line directional coupler comprising third and fourth coupled inner conductor sections, (1) said first and third inner conductor sections being connected in series between said equalizer input port and said equalizer output port, (C) each of said coupled inner conductor sections being a quarter-wavelength long at a frequency $f_0$ equal to $(f_c/3)$.

8. An equalized radio frequency circuit comprising (A) the equalizer defined in claim 7, and (B) a travelling wave tube having (1) an input port connected to a microwave circuit, (2) an output port connected to said input port of said equalizer, and (3) maximum gain at the frequency $f_c$.

9. An equalizer comprising in combination (A) a first directional coupler having an input port, a transmitted port, a coupled port, and an isolated port, (B) a second directional coupler having an input port, a transmitted port, a coupled port, and an isolated port, (1) said input port of said second coupler being connected with said coupled port of said first coupler, and (2) said isolated port of said second coupler being connected with said transmitted port of said first coupler, and (C) at least one transmission line filter in circuit with said couplers and connected to one of the interconnections therebetween, and (D) said interconnections being dissimilar in their absorbtive characteristics and having different insertion losses so as to result in the amount of energy transferred therethrough being unequal.

10. The equalizer defined in claim 9 further comprising (A) means terminating said isolated port of said first coupler, and (B) means terminating one port of said coupled and transmitted ports of said second coupler.

11. The equalizer defined in claim 9 in which the scattering matrix of each of said first and second couplers conforms to the matrix $$\begin{bmatrix} 0 & 0 & j\Gamma & \sqrt{1-\Gamma^2} \\ 0 & 0 & \sqrt{1-\Gamma^2} & j\Gamma \\ j\Gamma & \sqrt{1-\Gamma^2} & 0 & 0 \\ \sqrt{1-\Gamma^2} & j\Gamma & 0 & 0 \end{bmatrix}$$

where $$\Gamma=\frac{k \sin\left(\frac{\pi}{2}\frac{f}{f_0}\right)}{\sqrt{1-k^2 \cos^2\left(\frac{\pi}{2}\frac{f}{f_0}\right)}}$$

where $f$ is the operating frequency,
$f_0$ is the design frequency of the couplers, and
$k$ is the midband coupling factor of said couplers.

12. The equalizer defined in claim 9 in which each of said couplers is a parallel line directional coupler.

13. A transmission line equalizer having first, second, third and fourth ports, said equalizer comprising in combination (A) a first parallel line directional coupler having first and second coupled inner conductor sections, (B) a second parallel line directional coupler having third and fourth coupled inner conductor sections, (1) said first, second, third, and fourth inner conductor sections having the same electrical length, (C) first means connecting said first and third inner conductor sections in series between said first and third ports, (D) second means connecting said second and fourth inner conductor sections in series between said second and fourth ports, (1) said inner conductor sections being interconnected so that said first and third inner conductor sections couple a signal applied to said first port in the same direction on said second and fourth inner conductor sections, and (E) an open-circuited transmission line in parallel with said first connecting means, (1) said open-circuited transmission line having an electrical length equal to the electrical length of each of said inner conductor sections.

14. In apparatus having a radio frequency source producing energy within a first selected operating frequency range, an equalizer comprising in combination (A) a first directional coupler having an input port, a transmitted port, a coupled port, and an isolated port, (B) a second directional coupler having an input port, a transmitted port, a coupled port, and an isolated port, (1) said input port of said second coupler being connected with said coupled port of said first coupler, and (2) said isolated port of said second coupler being connected with said transmitted port of said first coupler, and (3) said first coupler having its input port in circuit with said source and receiving energy therefrom, (C) each of said first and second directional couplers having maximum coupling from its input port to its coupled port, and maximum directivity, at a frequency $f_0$, (D) said interconnected first and second couplers transferring a substantially uniform portion of the energy applied to said input port of said first coupler to said coupled port of said second coupler over a design second selected frequency range (1) wherein said first selected frequency range lies within said second selected frequency range, and (2) wherein said second selected frequency range, lies within the limits $2nf_0$ to $2(n+1/3)f_0$ where $n$ is a positive integer including zero.

15. The apparatus defined in claim 14 further comprising terminating means connected to said isolated port of said first coupler and to one port of said coupled and transmitted ports of said second coupler.

16. The apparatus defined in claim 14 in which the scattering matrix of each of said first and second couplers conforms to the matrix $$\begin{bmatrix} 0 & 0 & j\Gamma & \sqrt{1-\Gamma^2} \\ 0 & 0 & \sqrt{1-\Gamma^2} & j\Gamma \\ j\Gamma & \sqrt{1-\Gamma^2} & 0 & 0 \\ \sqrt{1-\Gamma^2} & j\Gamma & 0 & 0 \end{bmatrix}$$

where $$\Gamma=\frac{k \sin\left(\frac{\pi}{2}\frac{f_0}{f_0}\right)}{\sqrt{1-k^2 \cos^2 \frac{\pi}{2}\frac{f}{f_0}}}$$

17. The apparatus defined in claim 14 in which each of said couplers is a parallel line directional coupler having a pair of inner conductor coupling sections one quarter-wavelength long at the frequency $f_0$.

18. In radio frequency apparatus having a signal source operating within a first selected frequency range, an equalizer having first, second, third, and fourth ports, said equalizer comprising in combination (A) a first parallel line directional coupler having first and second inner conductor coupling sections, (B) a second parallel line directional coupler having third and fourth inner conductor coupling sections, (C) first means connecting said first and third coupling sections in series between said first and third ports, (D) second means connecting said second and fourth coupling sections in series between said second and fourth ports, (1) said inner conductor coupling sections being so interconnected that said first and third coupling sections couple a signal applied to said first port in the same direction on said second and fourth coupling sections, (E) said interconnected first and second couplers transferring a substantially uniform portion of the energy applied to said input port of said first coupler to said coupled port of said second coupler over a second selected frequency range (1) wherein said first selected frequency range lies within said second selected frequency range, and (2) wherein said second selected frequency range lies within the limits $2nf_0$ to $2(n+1/3)f_0$ where $n$ is a positive integer including zero, (F) each of said inner conductor coupling sections of said directional couplers being one quarter-wavelength long at said frequency $f_0$.

19. The apparatus defined in claim 18

(A) in which said equalizer has an insertion loss characteristic at said third port that monotonically increases with frequency and an insertion loss characteristic at said fourth port that monotonically decreases with frequency.

20. In apparatus having a radio frequency source producing energy within a first selected operating frequency range, an equalizer comprising in combination (a) a first directional coupler having an input port, a transmitted port, a coupled port and an isolated port, (b) a second directional coupler having an input port, a transmitted port, a coupled port and an isolated port (1) said input port of said second coupler being connected with said coupled port of said first coupler, (2) said isolated port of said second coupler being connected with said transmitted port of said first coupler, and (3) said first coupler having its input in circuit with said source and receiving energy therefrom, (c) each of said first and second directional couplers having maximum coupling from its input port to its coupled port, and maximum directivity, at a frequency $f_0$, (d) said interconnected first and second couplers transferring a substantially uniform portion of the energy applied to said input port of said first coupler to said coupled port of said second coupler over a second selected frequency range (1) wherein said first selected frequency range lies within said second selected frequency range, and (2) wherein said second selected frequency range lies within the limits $2(n+\frac{2}{3})f_0$ to $2(n+1)f_0$ where $n$ is a positive integer including zero.

21. The apparatus defined in claim 20 further comprising terminating means connected to said isolated port of said first coupler and to one port of said coupled and transmitted ports of said second coupler.

22. The apparatus defined in claim 20 in which the scattering matrix of each of said first and second couplers conforms to the matrix $$\begin{vmatrix} 0 & 0 & j\Gamma & \sqrt{1-\Gamma^2} \\ 0 & 0 & \sqrt{1-\Gamma^2} & j\Gamma \\ j\Gamma & \sqrt{1-\Gamma^2} & 0 & 0 \\ \sqrt{1-\Gamma^2} & j\Gamma & 0 & 0 \end{vmatrix}$$

where $$\Gamma=\frac{k\sin\left(\frac{\pi}{2}\frac{f}{f_0}\right)}{\sqrt{1-k^2\cos^2\left(\frac{\pi}{2}\frac{f}{f_0}\right)}}$$

where $f$ is the operating frequency, $f_0$ is the design frequency of the couplers, and $k$ is the midband coupling factor of said couplers.

23. The apparatus defined in claim 20 in which each of said couplers is a parallel line directional coupler having a pair of inner conductor coupling sections one quarter-wavelength long at the frequency $f_0$.

24. In radio frequency apparatus having a signal source operating within a first selected frequency range, an equalizer having first, second, third, and fourth ports, said equalizer comprising in combination (a) a first parallel line directional coupler having first and second inner conductor coupling sections, (b) a second parallel line directional coupler having third and fourth inner conductor coupling sections, (c) first means connecting said first and third coupling sections in series between said first and third ports, (d) second means connecting said second and fourth coupling sections in series between said second and fourth ports, (1) said inner conductor coupling sections being so interconnected that said first and third coupling sections couple a signal applied to said first port in the same direction on said second and fourth coupling sections, (e) said interconnected first and second couplers transferring a substantially uniform portion of the energy supplied to said input port of said first coupler to said coupled port of said second coupler over a second selected frequency range (1) wherein said first selected frequency range lies within said second selected frequency range, and (2) said second selected frequency range lies within the limits $2(n+\frac{2}{3})f_0$ to $2(n+1)f_0$ where $n$ is a positive integer including zero, (f) each of said inner conductor coupling sections of said directional couplers being one quarter-wavelength long at said frequency $f_0$.

25. The apparatus defined in claim 24 in which said equalizer has an insertion loss characteristic at said third port that monotonically increases with frequency and an insertion loss characteristic at said fourth port that monotonically decreases with frequency.

References Cited

UNITED STATES PATENTS

| | | | |
|---|---|---|---|
| 3,146,413 | 8/1964 | Butler | 333—31 |
| 3,234,555 | 2/1966 | Petrilla et al. | 333—10 X |
| 3,270,298 | 8/1966 | Seidel | 333—10 X |
| 3,278,864 | 10/1966 | Butler | 333—10 |

ELI LIEBERMAN, *Primary Examiner.*

HERMAN KARL SAALBACH, *Examiner.*

P. L. GENSLER, *Assistant Examiner.*

UNITED STATES PATENT OFFICE

CERTIFICATE OF CORRECTION

Patent No. 3,382,465 May 7, 1968

Robert Robbins

It is certified that error appears in the above identified patent and that said Letters Patent are hereby corrected as shown below:

Column 3, line 17, before "transmitted" insert -- pled port 48 thereon; the remainder of the input energy is transmitted through the coupler on the conductor 24 to the --.

Signed and sealed this 16th day of December 1969.

(SEAL)
Attest:

Edward M. Fletcher, Jr.
Attesting Officer

WILLIAM E. SCHUYLER, JR.
Commissioner of Patents